United States Patent [19]

Drimak

[11] Patent Number: 4,594,682

[45] Date of Patent: Jun. 10, 1986

[54] VECTOR PROCESSING

[75] Inventor: Edward G. Drimak, Johnson City, N.Y.

[73] Assignee: IBM Corporation, Armonk, N.Y.

[21] Appl. No.: 452,190

[22] Filed: Dec. 22, 1982

[51] Int. Cl.⁴ .................... G06F 15/347; G06F 12/00
[52] U.S. Cl. .................................. 364/900; 364/200; 364/736
[58] Field of Search ... 364/200 MS File, 900 MS File, 364/730, 736

[56] References Cited

U.S. PATENT DOCUMENTS

| | | | |
|---|---|---|---|
| 3,389,380 | 6/1968 | Ashbaugh et al. | 364/200 |
| 3,827,031 | 7/1974 | Kastner et al. | 364/200 |
| 3,938,096 | 2/1976 | Brown et al. | 364/200 |
| 3,949,378 | 4/1976 | Crabb et al. | 364/200 |
| 4,025,771 | 5/1977 | Lynch, Jr. et al. | 364/736 |
| 4,047,244 | 9/1977 | Finkemeyer et al. | 364/200 |
| 4,128,880 | 12/1978 | Cray, Jr. | 364/200 |
| 4,172,287 | 10/1979 | Kawabe et al. | 364/736 |
| 4,219,883 | 8/1980 | Kobayashi et al. | 365/49 |
| 4,251,860 | 2/1981 | Mitchell et al. | 364/200 |
| 4,264,953 | 4/1981 | Douglas et al. | 364/200 |
| 4,435,765 | 3/1984 | Uchida et al. | 364/200 |
| 4,476,522 | 10/1984 | Bushaw et al. | 364/200 |
| 4,541,046 | 9/1982 | Nagashima et al. | 364/200 |

OTHER PUBLICATIONS

IBM Technical Disclosure Bulletin, vol. 13, No. 2, pp. 420–421, (Jul., 1970), "Instruction Storage Buffers" by King et al.
IBM Technical Disclosure Bulletin, vol. 23, No. 4, pp. 1720–1724, (Sep. 1980), "Vector Mode Computation" by Huang et al.

Primary Examiner—James D. Thomas
Assistant Examiner—Thomas Lee
Attorney, Agent, or Firm—Pollock, Vande Sande & Priddy

[57] ABSTRACT

A cache memory, intermediate a CPU and a main memory, is employed to store vectors in a cache vector space. Three vector address operand registers are employed for reading vector operand elements from said cache memory and for writing results of vector operations back into cache memory. A data path from the cache memory allows vector operand elements to be written into selected local storage registers, and a path from the local storage registers to the cache memory includes a buffer. This apparatus allows overlapped reading and writing of vector elements to minimize the time required for vector processing.

7 Claims, 9 Drawing Figures

VECTOR PROCESSING

DESCRIPTION

1. Field of the Invention

The present invention relates to the architecture of a digital processor to enable the processor to efficiently perform vector operations.

2. Background Art

In the course of development of the data processing field, it has become evident that it may be desirable to provide specialized architecture to enhance machine operation on vector data.

Typically, to perform a given arithmetic function (even on non-vector data), each of the operands must be successively brought to the arithmetic unit, the function performed, and the result saved in some fashion. The time required to perform this overall operation may be much greater than that actually required to perform the given function due to the time required to actually deliver each operand, usually from memory, to the arithmetic unit, and the time required to save the result, also usually to memory. Under certain circumstances, this time can be considerably shortened by providing a cache, intermediate the main memory and the arithmetic unit (usually contained in a central processing unit). The advantage obtained is derived from the fact that the accessing time of the cache is significantly shorter than the time required to access the main memory. Of course, the advantage can only be achieved if the necessary operands can be transferred from the main memory to the cache, prior to the time that the arithmetic function is going to be performed, and desirably so that the transfer from main memory to the cache overlaps, in time, a prior function. In this fashion, the unit time to perform an arithmetic function can be considerably shortened.

In certain operations, e.g. vector operations, it is typically necessary to perform the same operation repetitively on each successive element of a set of data. In data processing, a vector X is an ordered array of elements $(X_1, X_2, X_3, \ldots X_{v(x)})$. The variable $X_i$ is called the ith component of the vector X, and the number of components, denoted by $v(x)$ (or simply v when the determining vector is clear from the context), is called the dimension or length of X.

In scalar machines, in order to perform such repetitive operation, it is necessary to operate by software program and indexing so as to successively bring each operand to the arithmetic unit and to return the result to memory. This type of task is very time consuming because of the delays associated with the memory-arithmetic unit transfers for each operation on the individual element of the ordered set.

Prior art illustrates a variety of improvements specifically aimed at vector operations. An illustrative vector operation performed by a vector machine is the adding of two operand vectors to produce a result vector. Each element of the result vector in this example is the sum of the corresponding ordered operands of the operand vectors. Basically, a vector machine is one which deals with these ordered sets of data by virtue of its hardware organization, rather than by software program and indexing, thus attaining a higher speed of operation.

Prior art vector architectures are described in Watson et al U.S. Pat. No. 3,573,851; Cray, Jr. U.S. Pat. No. 4,128,880; Muraoka et al U.S. Pat. No. 4,293,941 and Niemann U.S. Pat. No. 4,302,818. Of these, Muraoka is concerned with minimizing time lost in sequentially accessing different elements of a vector such that if access to one element is blocked, the memory cycle is not lost, rather access is accomplished to a different element of the vector during the time that access to the first element is blocked. The Watson, Cray and Niemann patents, on the other hand, teach the addition of substantial quantities of hardware to decrease the time consumed in vector operations.

Another technique to speed up computer operation is implicit load and store, which is described in Randell U.S. Pat. No. 3,541,528.

SUMMARY OF THE INVENTION

The present invention is predicated on the use of a cache memory (or cache) to perform the function of providing fast access to vector data. There are modifications necessary to enable a general purpose processor architecture to perform, in a time overlap fashion, the various functions required for vector processing. However, in accordance with the invention, the desired increase in vector processing speed is achieved with the addition of a relatively few elements in the data processing path, and several additional registers and simple processing apparatus in the addressing structure.

Accordingly, it is one object of the present invention to provide for relatively efficient vector processing without requiring substantial quantities of hardware dedicated to vector processing. It is another object of the present invention to apply the advantages of a cache memory to machine architectures suitable for vector processing. It is another object of the invention to provide efficient vector processing using cache memory for operand and result storage. Reading and writing from cache is effectively overlapped firstly by using registers associated with an ALU (which is provided for performing arithmetic functions) for temporary operand and result storage, and providing a buffer in a data path from the ALU to the cache.

The addressing structure includes three base address operand registers and a pair of offset registers. Two of the base address operand registers and one offset register are used for reading successive elements of two vectors, the offset register being incremented after certain ones of the reading operations. The third base address operand register and the other offset register are used for writing functions, with the offset register being incremented after each writing function. A vector mode selection control, operated under microprogram control, indicates when the processor is performing operations in the vector mode. The cache is subdivided into a vector space and a scalar space, and when the vector mode selection control indicates operation in the vector mode, the cache vector space is addressed using an address formed by concatenating the contents of a selected one of the base address operand registers and a selected one of the offset registers.

The data processing apparatus provides a path for data output from the cache, through a byte shifter to either one of two specified registers, depending upon the progress through the processing functions. A vector element can be applied to the ALU either directly from one of the specified operand registers or indirectly from the second operand register through another operand register or local storage. The result of the arithmetic function can be provided through the second specified operand register either to local storage or to another operand register. The data path back to the cache includes a buffer to enhance time overlap operation.

To take advantage of this vector processing, three explicit microprogrammed functions are provided along with a fourth implicit function. The three explicit functions are read vector operand, read vector operand and store, and load vector register. In this connection, the term vector register is specific to a portion of the cache vector space into which plural vector registers have been mapped. The implicit function operates during vector operating mode and provides for reading from an address in the cache, specified by the contents of one of the address operand registers and the offset register; this read operation is performed during every cycle that the data cache is not otherwise being used.

The read vector operand micro-instruction:

1. Loads a specified vector operand element accessed from the cache vector space in a preceding cycle into a specified one of the vector operand registers;
2. Loads a different vector operand element accessed from the cache vector space into a local storage location; and
3. Increments the contents of the offset register used during reading operation.

The read vector operand and store micro-instruction performs the same functions as the read vector operand instruction plus:

4. Loads the contents of a local storage location (which may contain an arithmetic result) into a shifter buffer.

In the following cycle, the same instruction:

5. Writes the contents of the shifter buffer into the cache vector space; and
6. Increments the offset register associated with writing operations.

The load vector register function:

1. Transfers a vector operand from local storage or one of the vector operand registers to the cache vector space at a specified address; and
2. Increments the offset register associated with the write operation.

Application of the invention produces a machine with both scalar and vector processing capabilities. Since the cache is partitioned into vector and scalar data areas, the vector mode selection (when indicating vector operation) is used to enable addressing of the cache vector area.

Accordingly, in accordance with one aspect, the invention provides:

a cache memory intermediate, a main memory and a central processing unit, said cache memory having scalar data and vector data areas;
vector mode selection means; and
cache addressing means responsive to said vector mode selection means and said central processing unit for accessing said vector or said scalar data areas.

The invention also provides an efficient method of vector processing without requiring substantial additional hardware, especially by providing for vector registers mapped into cache and using an implicit read vector register operation each time the cache is not otherwise addressed during vector operation.

BRIEF DESCRIPTION OF THE DRAWINGS

The present invention will now be described so as to enable those skilled in the art to make and use the same in the following portions of the specification when taken in conjunction with the attached drawings in which like reference characters identify identical apparatus and in which.

DETAILED DESCRIPTION OF PREFERRED EMBODIMENTS

Figure 1:
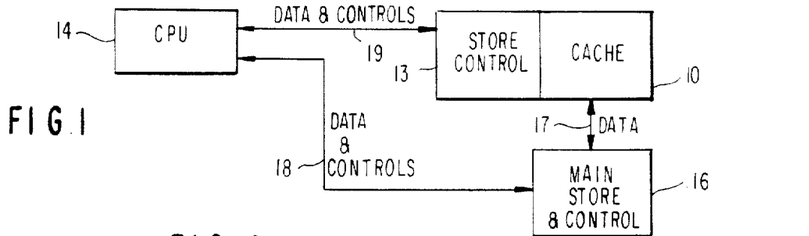
FIG. 1 is a block diagram illustrating the relationship of central processing unit, cache and main memory.

FIG. 1 illustrates, in block diagram fashion, the relationship of a central processing unit (CPU 14), a relatively rapid access cache 10, along with the cache storage and control 13, and a main storage and control 16. More particularly, as shown in FIG. 1, the CPU 14 communicates both with the store control 13 of the cache 10 and the main store and control 16 via data and control paths 19 and 18, respectively. In this fashion, the CPU 14 can access and control either data stored in the cache 10, or data stored in the main memory 16. For data transfers between the cache 10 and the main storage and control 16, a data path 17 is provided. Accordingly, it should be apparent that the cache 10 is located intermediate the main memory 16 and the CPU 14.

Figure 2:
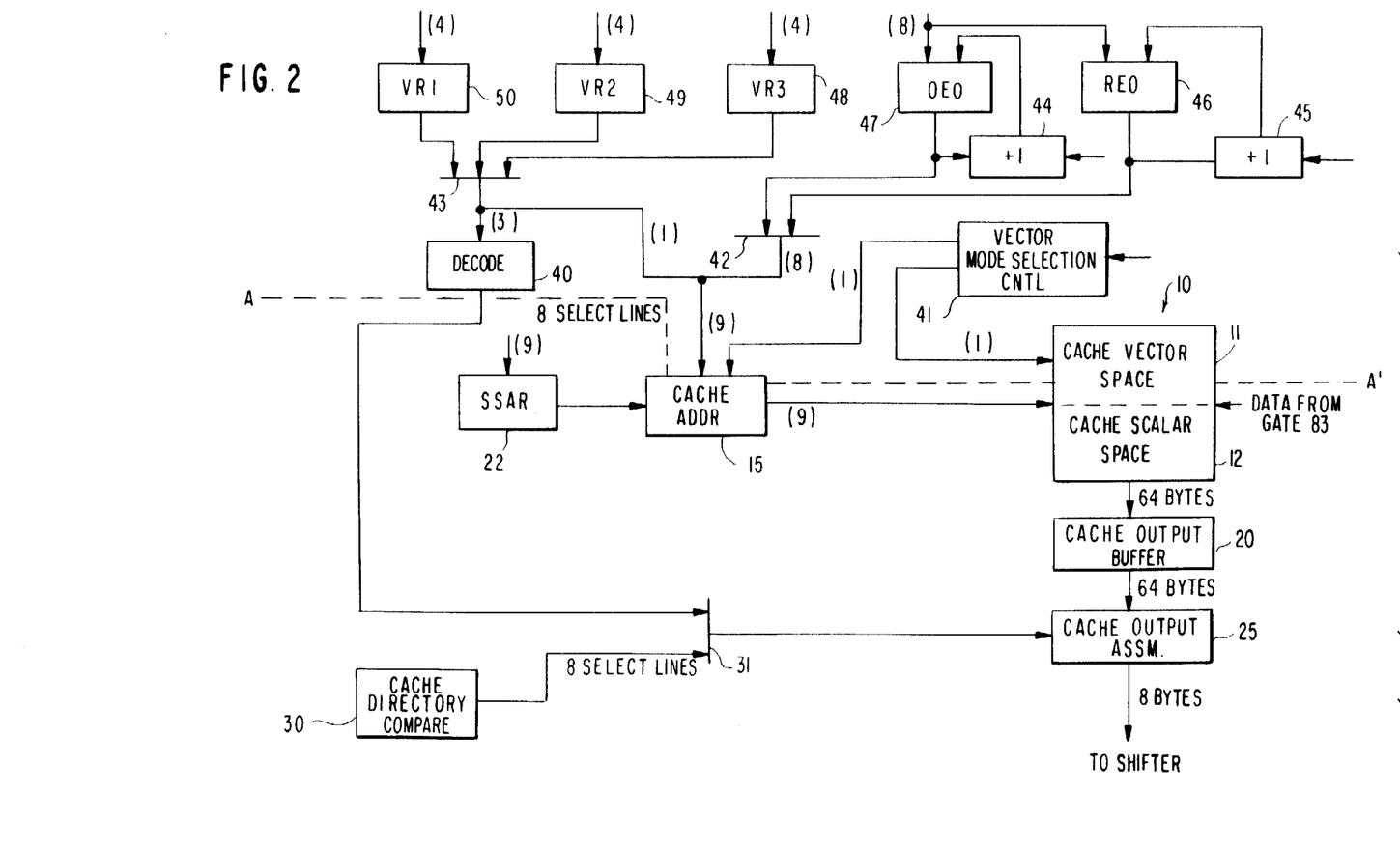
FIG. 2 illustrates the apparatus used for addressing cache, specifically illustrating the apparatus employed to address the cache vector space.

Referring now to FIG. 2, the cache 10 is shown to include a cache vector space 11 and cache scalar space 12. That portion of FIG. 2 below the dashed line A—A' illustrates conventional (i.e. scalar) apparatus for addressing the cache 10. Particularly, an address register SSAR 22 provides an input to cache address 15, which addresses the cache 10. Data selected by the address so supplied is coupled to a cache output buffer 20, from whence it is coupled to the cache output assembler 25. Simultaneously, the cache directory compare 30 identifies which portion of the data in the cache output assembly 25 has been addressed, the cache output assembly 25 provides for the appropriate selection and the resulting data is coupled to the CPU 14, specifically to a byte shifter 52 via data path 51 (see FIG. 3). For convenience, the numbers in parentheses associates with different data coupling lines identify the width (in bits) of the information passing on different paths. Thus, as shown in FIG. 2, the cache address is 9 bits, selecting 64 bytes from the cache. The output of the cache directory compare 30 selects one 8-byte group of the 64 bytes, and the selected 8-byte group is coupled to the shifter 52 via data path 51, for subsequent use in the CPU 14.

Figure 4:
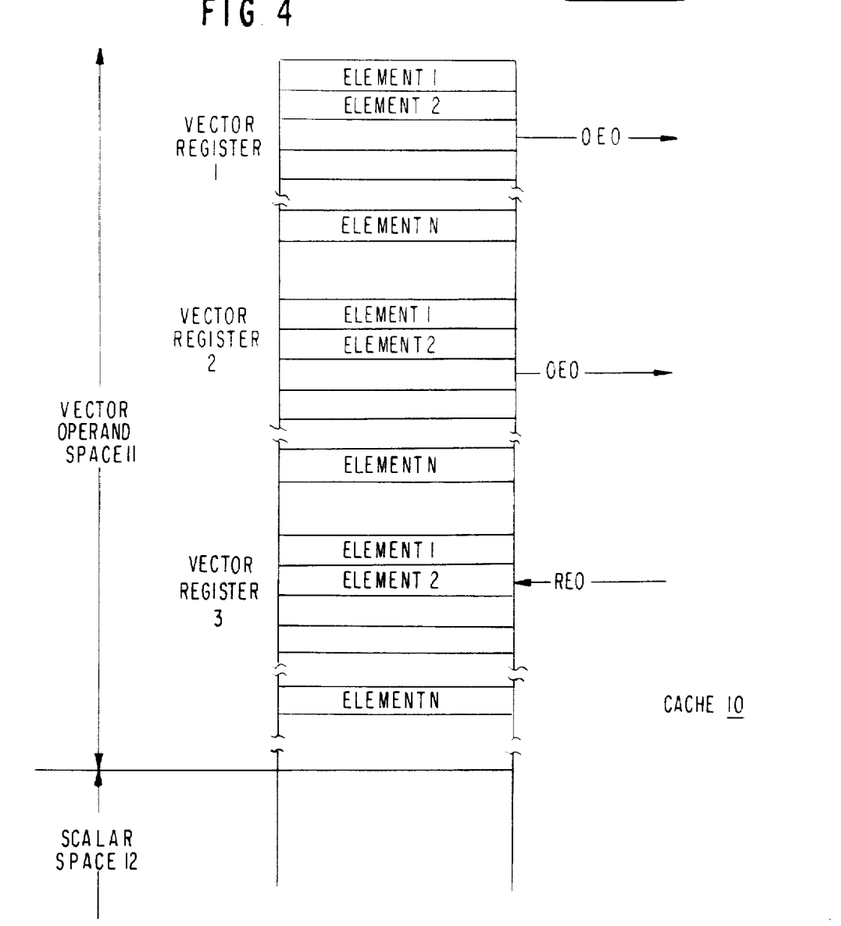
FIG. 4 illustrates how plural vector registers are mapped into the cache vector space.

In accordance with the invention, the cache 10 is used as a convenient space for implementing vector registers. For purposes of this description, the cache 10 is assumed to take one machine cycle to read data and 1½ cycles to write data; the write consisting first of a cache read followed by a cache write modifying the data that was just read. In accordance with the invention, multiple element vector registers are mapped into the cache vector space such that an operand address register may be used to denote a particular vector register, and an offset register may be used to access consecutive elements of the vector register. See for example, FIG. 4 which is a memory map of cache 10, showing it divided into vector space 11 and scalar space 12. Plural vector registers are mapped into the vector space 11. FIG. 4 shows three such vector, registers one for each of vector operands 1, 2 and 3. Those skilled in the art will realize that many more than the three illustrative vector registers may be mapped into the vector space 11. The vector registers each have a capacity of N vector elements, each element is separately addressable. If concatenation of the initial contents of a base and offset address register sums to the address of vector register 1, element 1, that element may be addressed. If thereafter, the contents of the offset register is incremented, vector register 1, element 2 may be accessed. As will be described, the embodiment of the invention illustrated herein uses a single offset register, and two base registers to successively access successive elements of two vector register operands by incrementing the offset register only after the selected elements of both vectors have been accessed. Thus, with the offset register at a particular value, corresponding elements of two vectors are accessible, as illustrated in FIG. 4.

A combination of a third base register and a second offset register allows access to a third vector register mapped in the vector space 11. Reading and writing may be interleaved by incrementing the offset registers (OEO and REO) at different times. Thus, FIG. 4 illustrates a snapshot of a typical condition of OEO and REO in which REO allows access to a given element, whereas OEO is, simultaneously, in a condition to allow access to the next higher adjacent element.

Referring now to FIG. 2, three vector operand base address registers (VR1, VR2 and VR3) 50, 49 and 48 are provided for selecting up to two vector operands and a result vector. The two element offset registers (OEO, REO) 47 and 46, respectively, plus update circuitry (44, 45) are provided to select particular elements of the vector operand and the result vector. The use of two offset registers permits overlapping the fetch of an operand element with the writing of a previously generated result element. The vector operand base address registers and the offset registers 46–50 are initialized at the beginning of a vector operation. The system is put into vector operation mode for the duration of the vector operation by changing the condition of the vector mode selection control 41. The cache address 15 is modified as follows. In a scalar machine, cache address 15 merely provides access to cache 10. To employ the invention, cache address 15 is provided with a second input for access to cache vector space 11. The second input has the ability to concatenate its cache vector address inputs when vector operation is indicated by the condition of vector mode control 41.

More particularly as shown in FIG. 2, a sequence of vector operand elements is accessed from the cache vector space 11 as follows:

The four bits in VR1 50 (coupled to gate 43) are divided into three bits coupled to a decoder 40, the remaining bit is concatenated with the 8 bits from one of the offset registers 46 or 47, (coupled to gate 42) to form a 9-bit address to address the cache 10 via cache address 15. During vector operations, the vector mode selection control 41 is in a distinctive state providing signals to both the cache address 15 and the cache 10, indicating addressing of the cache vector space 11. The decoder circuit 40 energizes a selected one of eight select lines via gate 31 to select one 8-byte group of the eight such groups output by the cache 10 in response to the supplied address.

The next element of a vector is accessed by merely incrementing the appropriate offset register. Additional elements of the same vector are accessed by successively incrementing the offset register.

A second vector may be accessed using the contents of VR2 49 (coupled to gate 43), for example, and the identical offset register. Of course, under these circumstances the offset register is incremented only after accessing the associated element of the second vector operand in sequence.

Addressing is provided for a third vector (the result vector) employing the register VR3 48 (coupled to gate 43) and a different offset register (REO) 46. The different offset registers are employed so that they may be incremented at different times to overlap the reading and writing, as will be explained in more detail below.

Those skilled in the art will understand that while the width of the different information elements employed in addressing the cache vector space 11 as illustrated in FIG. 2, are suitable, other different size cache vector spaces 11 can be addressed by varying the information field in the vector base address operand register and/or offset registers.

Figure 3:
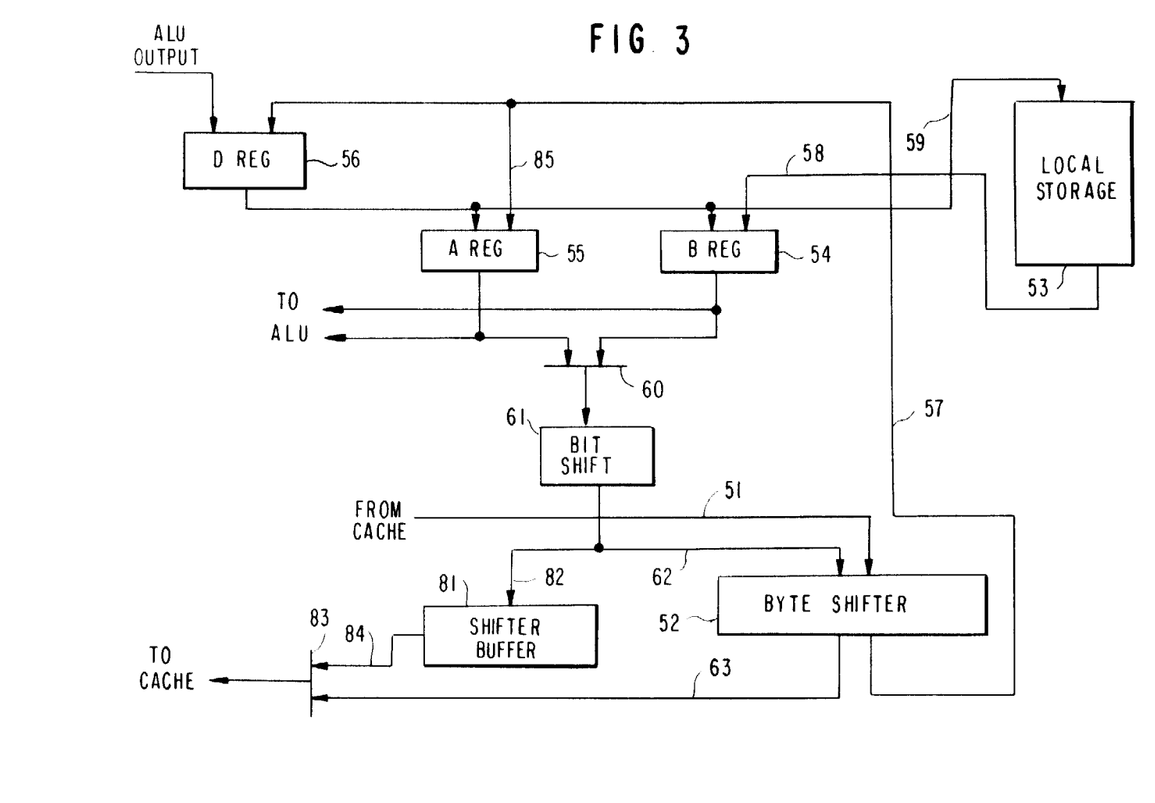
FIG. 3 is a block diagram of the portion of the central processing unit associated with transferring data to/- from cache and to/from an arithmetic logic unit.

Referring now to FIG. 3, the data path to/from cache 10 and to/from the (unillustrated) arithmetic logic unit ALU is illustrated in detail. The apparatus of FIG. 3 is generally considered part of CPU 14. As shown in FIG. 3, the data path from the cache 10 includes a path 51 providing one input to a byte shifter 52. One output of the byte shifter 52 is coupled over path 57 and input to a D register 56, and is also coupled, over path 85, to an A register 55. The D register 56 has an output, coupled over path 59, to the other input of the A register 55, an input of the B register 54 and an input of a local storage unit 53. The local storage unit 53 may be implemented in the form of a push down stack so as to provide storage for multiple data words or vector elements. The output of the local storage register 53 is coupled over a path 58 to the other input of the B register 54. Outputs of the A register 55 and B register 54 are coupled as inputs to the ALU as well as to a gate 60. The gate 60 is coupled to a bit shifter 61, whose output is coupled over a path 62 to another input of the byte shifter 52, as well as over a path 82 to a shifter buffer 81. A second output of the byte shifter 52 is coupled via path 63 to gate 83. The output of the shifter buffer 81 is also coupled to gate 83 via path 84. The output of gate 83 is provided as the input to the data cache 10.

As indicated above, one of the general objects of the invention is to speed up vector processing without requiring substantial additional hardware. The hardware required by the invention, over and above the hardware required for scalar processing is illustrated in FIGS. 2 and 3. In FIG. 2, the additional required hardware is illustrated above the dashed line A—A'. In FIG. 3, the hardware required by the invention consists of the data paths 82, 84 and 85 as well as buffer 81 and gate 83. Those skilled in the art will understand that the CPU 14 may include still other (unillustrated) registers; these are not described as they are not required for vector processing.

DESCRIPTION OF MICROPROGRAMMED OPERATION

The following portions of this specification will describe the operation of the apparatus illustrated in FIGS. 2 and 3 in connection with the three explicit microprogrammed instructions referred to above as well as the fourth implicit function.

At the beginning of any sequence of vector operations, the microprogrammed control unit (not illustrated) performs two functions: the first function is to change the state of the vector address selection control 41 (FIG. 2), to indicate to the addressing circuitry that subsequent operations will employ the vector space 11 of the cache 10. The second function is to load the vector address operand registers 48–50 as well as the offset registers 46, 47. Typically, the quantities loaded in the first and second vector base address operand registers 50 and 49 will be different, so as to enable access to two different vector registers in the vector space 11. The contents loaded into the third vector base address operand register 48 may be identical to the contents of one of the other two vector address operand registers, or it may be different, depending upon the needs of the particular operation to be performed. Because of the interleaved reading and writing operation, to be explained below, the result vector register can be identical to one of the two vector registers containing the operand. As will be seen below the write access, to write the results of a particular vector element, is subsequent to the read access and therefore one of the two vector registers containing the operands can be used to write the result.

The offset registers 46 and 47 will typically be loaded with an identical quantity, at the beginning of a vector operation; although as will be seen below, they are incremented at different times.

Figure 5:
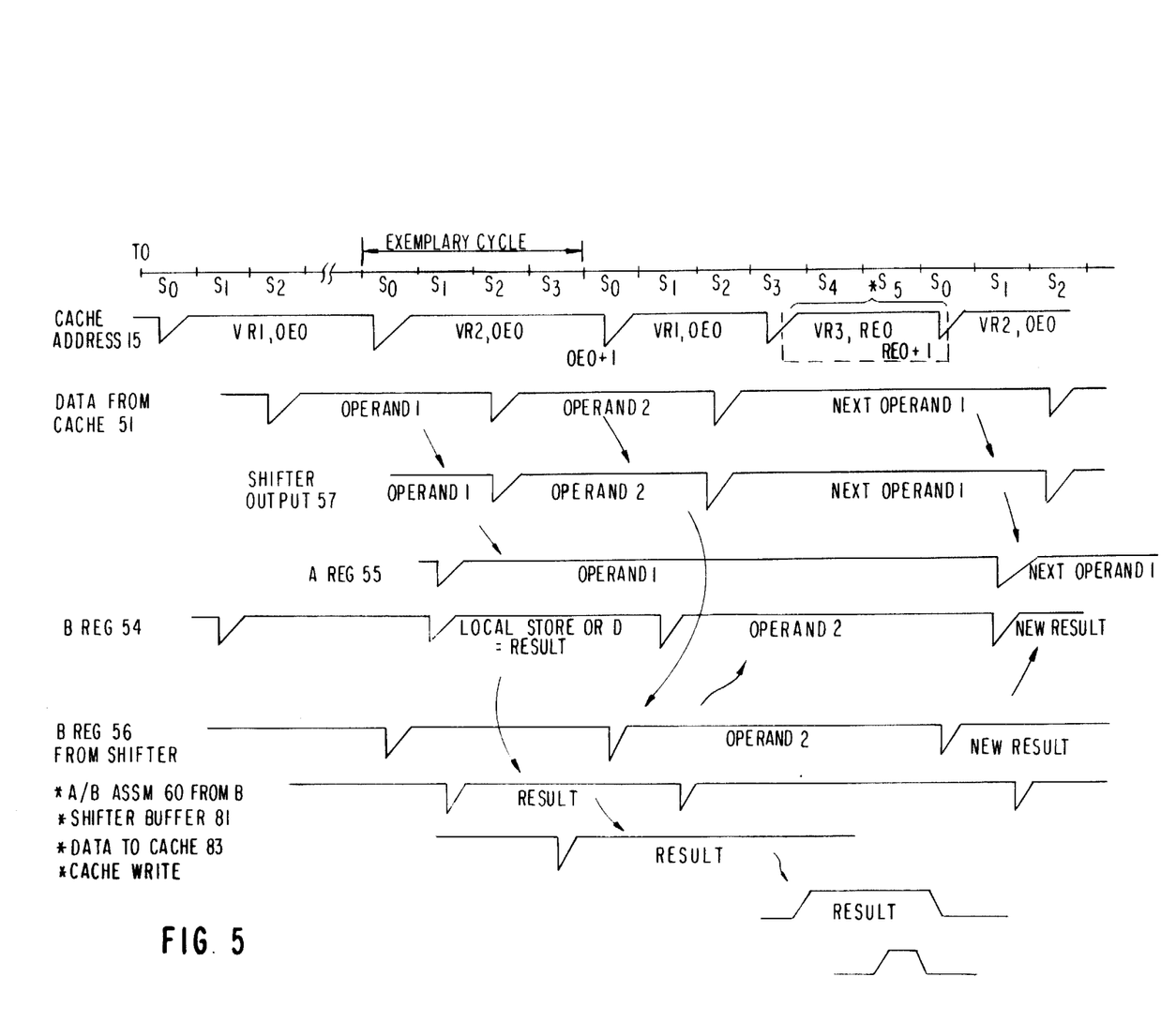
FIGS. 5 and 6 show timing diagrams for respectively the read vector operand functions and the load vector register functions.

Referring to FIG. 5, a timing diagram is illustrated for two of the explicit microprogrammed instructions of read vector operand, and read vector operand and store.

However, before discussing these explicit microprogrammed instructions, the implicit function will be described, since it is also illustrated.

We assume that at $T_0$, the base address operand registers 48–50 and the offset registers 46, 47 have been loaded, the vector mode selection control 41 has changed its state to indicate a vector operation, and some other operation is being performed which does not require access to the cache 10. Under these circumstances, and for every other memory cycle under these conditions when the cache 10 is not otherwise referred to, the operation reflected in FIG. 5 in the first cycle (that is in the time period extending from the first sub-period $S_0$ to the next sub-period identified as $S_0$), the cache 10 is addressed with the address contained in register 15. At this time, cache address 15 will address a vector register defined by the contents of base address register 50 and offset register 47. Loading of cache address 15 is effected by operation of gates 42 and 43 and the concurrent indication of vector mode by vector mode control 41. That operand, identified as operand 1 is transferred from cache 10 beginning at the termination of the first $S_2$ sub-period, and is present on the conductor 51. Accordingly, at the beginning of the next time $S_0$ (in the period identified as the exemplary cycle) in FIG. 5, operand 1 is available at the output of the byte shifter 52, i.e. on conductor 57. Typically, operand 1 is the first element of a first vector which will take part in some vector arithmetic.

At this point, we can now describe the functions performed by the explicit read vector operand microinstruction. Timing for this function is also shown in FIG. 5 (except that the operations identified by the asterisk do not occur in the read vector operand microinstruction—more particularly the contents of VR3 and REO are not employed, nor is the timing in the last four lines of FIG. 5 applicable).

Accordingly, at the beginning of the exemplary cycle (extending in sub-periods $S_0$–$S_3$), the cache 10 is again addressed using the contents of VR2, OEO. Typically, this will address the first element of the second vector, the first element of the first vector (operand 1) having previously been addressed prior to the initiation of the exemplary cycle. Just at the termination of this addressing operation, the offset register 47 (or OEO) is incremented and rewritten, the reason for this will become apparent hereinafter.

At the same time that the cache 10 is being addressed in the exemplary cycle, operand 1, which at this time exists on the Output conductor 57 is read into the A register 55, via the path 85.

Beginning at about the $S_2$ sub-period of the exemplary cycle, the addressed element of operand 2 is present on the output 51 of the cache 10. As shown in FIG. 5, this is directly coupled to the output 57 of the byte shifter 52 and is loaded into the D register 56, just after the end of the exemplary cycle (specifically in the $S_0$ sub-period following the exemplary cycle).

Because of operations required by the implicit function, if an element of operand 1 is required, the preceding micro-instruction cannot be a storage reference to the cache 10 or any function that requires the output of the byte shifter 52.

At the conclusion of the exemplary cycle, therefore, the CPU 14 contains elements of both vector operands, an element of operand 1 is in the A register 55 and an element of operand 2 is in the D register 56. Furthermore, incrementing OEO enables addressing of the next element of the first and second vector registers.

The following description relates to the explicit function of read vector operand and store. Just as in the simple read vector operand instruction, on the cycle preceding the exemplary cycle, an element of the first vector register is read, such that at about time $S_1$ in the exemplary cycle, the A register 55 contains the first element of operand 1. Just as in the simple read vector operand instruction, the exemplary cycle is used to address and read an element of the second vector register so that at the conclusion of the exemplary cycle, the addressed element of operand 2 is located in the D register 56. Furthermore, just as in the read vector operand instruction, at the very end of the exemplary cycle, the OEO register is incremented. In the cycle immediately following the exemplary cycle, the next element of the first vector is addressed, transferred from the cache 10 via path 51 to the output 57 of byte shifter 52, so that before the end of the cycle following the exemplary cycle, the next element of operand 1 is available on the output path 57 of byte shifter 52.

At about the same time (particularly beginning at about $S_3$ in the cycle following the exemplary cycle) the third base address register 48 is employed for reasons which will become clear hereinafter.

The first element of operand 2 is transferred, in the cycle following the exemplary cycle, from the D register 56 to the B register 54. As a result, and referring again to FIG. 3, the two elements destined for the arithmetic operation are now located in the A register 55 and the B register 54.

These quantities can now be transferred to the ALU, the result is set into the D register 56, as shown in FIG. 5. Furthermore, the result is relatively immediately transferred from the D register 56 to the B register 54 or to local storage 53.

For convenience in describing writing of results, we will assume that the results have reached the B register 54 beginning at about time $S_1$ in the exemplary cycle. While this is obviously not the case for an operation being performed in the exemplary cycle, it is true for an operation performed in the preceding cycle, and therefore in a typical vector operation which requires repeatedly running through a fixed sequence of steps, this description is completely general.

The result, now residing in the B register 54 is transferred through the gate 60 and bit shifter 61. The result passes through the gate 60 and bit shifter 61 relatively rapidly and is then stored in the shifter buffer 81 via path 82, so that a result available in the B register 54 at about $S_0$ in a cycle reaches the shifter buffer 81 at about time $S_3$ in the same cycle. The use of the shifter buffer 81 can be gleaned from viewing FIG. 5. The B register from which the result was available, is necessary for storage of an element of operand 2, and thus must be cleared. However, the byte shifter 52 is, at about this time, occupied in transferring an element of operand 1, and thus cannot be used to transfer a result. Furthermore, the cache 10 itself is occupied in reading out the element of operand 1. Thus, the shifter buffer 81 is used to buffer the result until it can be written to the cache 10. Reading an element of vector 1 terminates at about time $S_3$ in the cycle following the exemplary cycle of FIG. 5. Accordingly, the result from the buffer 81 is transferred via the gate 83 to the cache 10, beginning at about time $S_3$ in the cycle following the exemplary cycle. The actual cache write is shown to occur near the end (sub-period $S_5$— of the cycle following the exemplary cycle). Following the transfer of the addressing information for register 46 and 48 to register 15, the update circuitry 45 increments the contents of REO register 46.

Accordingly, it should be apparent from FIG. 5 that the read vector operand and store micro-instruction effects the following functions:

1. Loads a vector operand 1 element accessed in a preceding cycle into the A register 55;
2. Loads vector operand 2 element accessed from the cache into a local storage location, e.g. the D register 56; 3. Loads the result from a preceding operation, from a local storage location (e.g. B register) into the shifter buffer 81. Furthermore, during subsequent periods of time, the same instruction:
4. Writes the contents of the shifter buffer 81 into the appropriate element of the cache result vector register; and
5 increments both the operand element offset, and the result element offset; the operand element offset is incremented after it is used in conjunction with the VR2 register, the result element offset is incremented after it is used in connection with the VR3 register.

Although the particular steps of exemplary microinstructions have been described, those skilled in the art will be aware that other different micro-instructions could use the present invention to similar advantage with slightly different results. For example, if intermediate results are required for subsequent operations, it may be inefficient to write those intermediate results to cache 10, and then re-read the cache 10 to withdraw those intermediate results. In such a case, the intermediate results, from the ALU, can be coupled via the D register 56 to local storage 53. When needed, the intermediate results can be withdrawn from local storage via path 58 and applied to the B register 54, where those intermediate results can be employed with other intermediate results, or data withdrawn from cache 10, to produce still other intermediate results or a final result, which itself may be written back to cache 10.

Other and still different modifications will occur to those skilled in the art from a review of FIGS. 3 and 5 and the preceding description.

Figure 6:
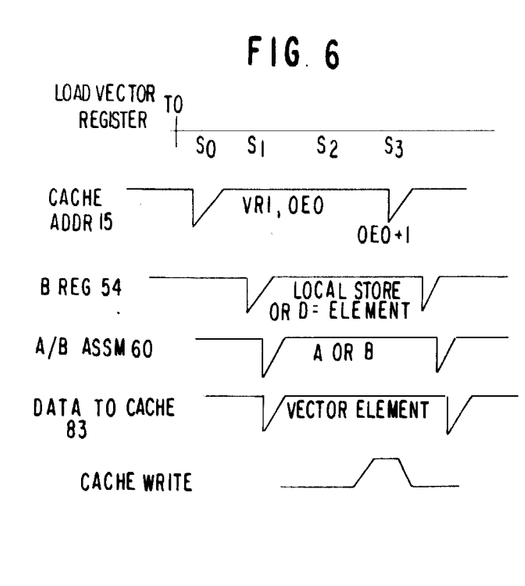

FIG. 6 is a timing diagram illustrating the operations performed during the third explicit micro-instruction, e.g. load vector register. In this instruction, a source operand located in local storage 53 or the D register, or the A register 55, respectively, is written to a specified location in cache 10. The location is determined by concatenating the contents of VR1 and OEO. In the example shown in FIG. 6, the element written in cache is obtained from the B register 54. Since the B register 54 can be written from D register 56 or local storage 53, using the B register 54 as the source is not at all limiting. As shown in FIG. 6, at the beginning of the cycle, the cache 10 is addressed with the contents of VR1 and OEO. Just after addressing cache 10, the contents of the B register 54 are coupled through the gate 60, through the bit shifter 61, through path 62, the byte shifter 52, the path 63 and the gate 83 to cache 10. In that cycle, at sub-period $S_3$, the write strobe is generated to write the data. Substantially simultaneously therewith, the contents of OEO are incremented by the update circuitry 44. Since the preceding description has described, in detail, the various steps required for execution of the microprogrammed functions, those skilled in the art will be able to provide the necessary gating signals to effect the various steps, as described. Accordingly, no further description of those gating signals appears necessary.

Figure 7:
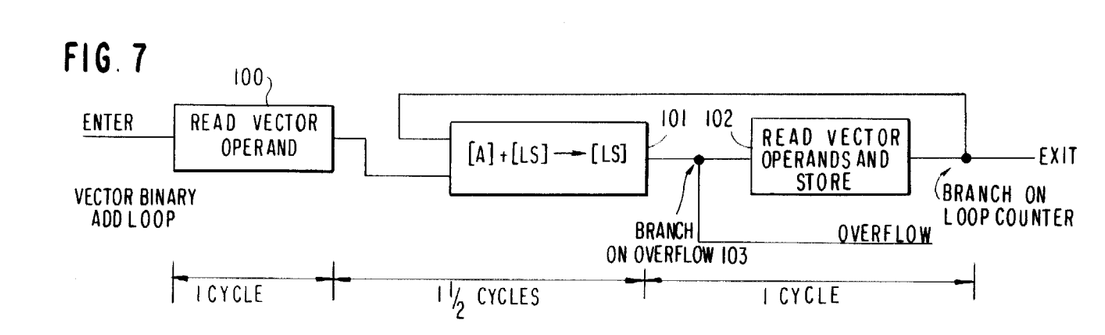
FIGS. 7, 8, and 9 are examples of flow diagrams showing use of the microprogram instructions described above to perform respectively a vector binary add, a store vector register or a load vector register function.
Figures 8, 9:
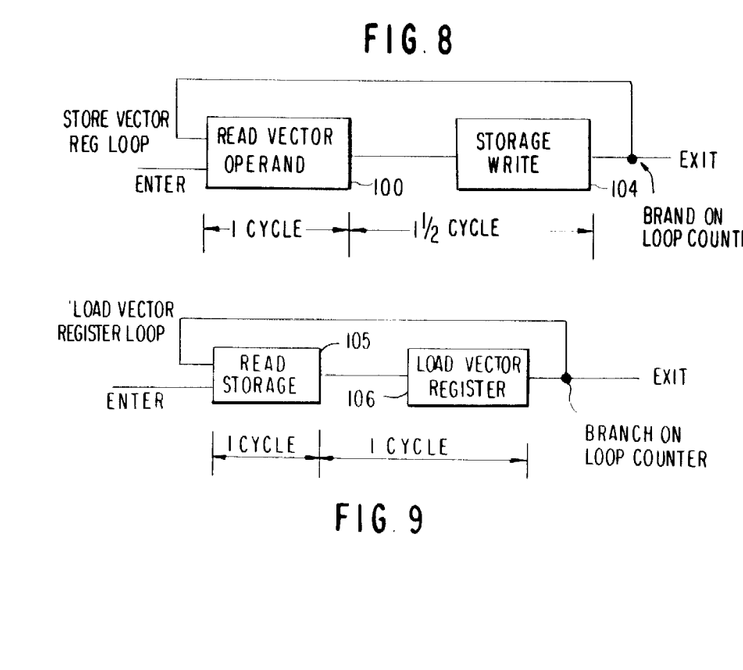

FIGS. 7, 8 and 9 illustrate how macro functions of vector binary add, store vector register and load vector register, respectively, can be implemented using the previously described micro-instructions.

More particularly, and referring to FIG. 7, the vector binary add loop is illustrated. As shown in FIG. 7, the vector binary add loop includes a read vector operand micro-instruction 100, an arithmetic instruction 101 and a read vector operand and store micro-instruction 102. The loop includes a single entry point, a normal exit, and provides an error exit for an overflow condition. Function 100 is the read vector operand micro-instruction which is described above in connection with FIG. 5. At the conclusion of the instruction, two vector elements are available to the CPU. The first vector element is obtained in an implicit operation preceding step 100, the second during step 100. Function 101 produces a sum. A branch point 103 provides an error exit in the case of overflow. Since function 101 does not require access to the cache 10, during its execution an implicit read step is performed to read the next element of the first vector operand. Assuming the absence of an overflow, function 102 is the read vector operand and store instruction also described in connection with FIG. 5. This provides for reading an additional element of the second vector, and storing the result computed at function 101. The loop provides for a branch on a loop counter, initially set to the number of elements in the vector. Assuming the loop counter has not reached the branching point, the processor loops back and performs function 101 on the vector operand elements extracted at function 102. The loop of functions 101 and 102 continues until each of the elements of the vectors has been processed. This concludes the function and thus it exits.

At the bottom of FIG. 7 timing is illustrated. The read vector operand instruction 100 consumes one cycle and the arithmetic operation consumes 1½ cycles. The function 102 is shown as one cycle since the store function is executed during the following arithmetic function 101.

FIGS. 8 and 9 relate respectively to store vector register (write the contents of a vector register from cache vector space 11 to main memory 16) and load vector register (write into a vector register in cache vector space 11 from main memory 16).

FIG. 8 illustrates a store vector register loop macro-instruction for storing a plurality of elements of a vector in a vector register mapped into the cache 10. More particularly, the contents of a vector register in cache vector space 11 are transferred to cache scalar space 12. From this location, conventional instructions can write main memory 16. As shown in FIG. 8, the loop includes two micro-instructions, the read vector operand 100 and a storage write 104. The loop has a single entrance point and a single exit point; typically it is entered after having set the loop counter indicating the number of elements in a vector. The timing is indicated at the bottom of FIG. 8. Function 100 reads the contents of a cache vector register from the cache vector space 11 and function 104 writes the data just read to cache scalar space 12. Since function 100 is discussed above, no further description is necessary. Function 104 is a conventional scalar operation of writing to the scalar space 12 of cache 10.

FIG. 9 illustrates a load vector register loop macro-instruction. The loop has a single entry point and a single exit point. For each iteration, a vector operand element is read from cache scalar space 12 by function 105 and written into a local storage location, e.g. D register 56. Function 106 is used to load a vector register in cache vector space 11. The function 106 is described in connection with FIG. 6. Again, the timing is indicated at the bottom of FIG. 9.

FIGS. 7-9 are merely exemplary applications of the specific micro-programmed function capable of efficient execution with the inventive apparatus and method. Those skilled in the art will, after reviewing this description, be able to synthesize still other macro-instruction loops employing the method and apparatus of the invention.

I claim:

1. An apparatus for adapting a scalar data processor having a cache memory connected between main memory and a central processing unit, for efficient vector processing including:
   means for defining separate scalar and vector data areas in said cache memory,
   vector mode selection means for selectively enabling access to either said vector or scalar data areas of said cache memory,
   cache memory addressing means including separate vector and a scalar addressing means responsive to said vector mode selection means and said central processing unit for accessing either said vector or scalar data areas of said cache memory,
   wherein said central processing unit includes:
   a pair of operand registers, and
   a result register,
   coupling means for providing a data path from said operand registers to an ALU and a further data path from an ALU to said result register,
   second coupling means for providing a data path from said cache memory to one of said operand registers and to said result register;
   an output buffer;
   third coupling means providing a data path from either of said operand registers to said second coupling means and to said output buffer;
   fourth coupling means providing a data path from said second coupling means or said output buffer to said cache memory; and
   fifth coupling means providing a data path from said result register to either of said operand registers.

2. An apparatus for adapting a scalar data processor having a cache memory connected between main memory and a central processing unit, for efficient vector processing including:
   means for defining separate scalar and vector data areas in said cache memory;
   vector mode selection means for selectively enabling access to either said vector or scalar data areas of said cache memory;
   cache memory addressing means including separate vector and scalar addressing means responsive to said vector mode selection means and said central processing unit for accessing either said vector or scalar data areas of said cache memory;
   wherein said vector cache addressing means for accessing said vactor data area of said cache memory includes:
   a plurality of base registers, and a pair of offset registers;
   means for combining the contents of one of said plurality of base registers and one of said offset registers for accessing said cache vector area defined by said contents.

3. The apparatus of claim 2 wherein a first of said offset registers is used for a read access and the second of said offset registers is used for a write access.

4. The apparatus of claim 3 which includes:
   means for incrementing said first offset register after a read access is effected and means for incrementing said second offset register after a write access is effected.

5. A method of performing vector processing on data residing in a cache memory, connected between a central processing unit, including an ALU, and main memory, comprising the steps of:
   a. providing plural vector address operand registers;
   b. providing a vector mode selection device for commanding vector operations when in a distinctive condition;
   c. providing at least two vector operand registers coupled between an output of said cache memory and the ALU;
   d. providing a buffer register between either of said vector operand registers and said cache memory;
   e. reading an element of a first vector operand from said cache memory selected by one of said vector address operand registers on each machine cycle that vector operation is commanded, in the absence of any other cache reference.

6. The method of claim 5 further including the steps of:
f. immediately thereafter storing said vector operand element of step (e) in one of said vector operand registers and substantially simultaneously reading an element of a second vector operand from said cache memory selected by another of said vector address operand registers, and incrementing said vector address operand registers;
g. immediately thereafter storing said element of said second vector operand in another of said vector operand registers and substantially simultaneously accessing said cache memory to read a subsequent element of said first vector operand;
h. immediately thereafter transferring vector operand elements from said vector operand registers to said ALU and providing a result from said ALU to a vector operand register, substantially simultaneously transferring said subsequent element of said first vector operand to a vector operand register, and reading a subsequent element of said second vector operand from said cache memory and incrementing said vector address operand registers immediately thereafter,
i. immediately thereafter transferring said result into said buffer register and substantially simultaneously transferring said subsequent element of said second vector operand to one of said vector operand registers and reading a further subsequent element of said first vector operand from said cache memory;
j. immediately thereafter writing said result from said buffer register to said cache memory at a location specified by a third of said vector address operand registers, and immediately thereafter incrementing said third vector address operand register.

7. The method of claim 6 in which said plural vector address operand registers include three vector base address operand registers and two vector offset address registers, and wherein said steps (f) and (h) each increment a first of said vector offset address registers and said step (j) increments a second of said vector offset address registers.

* * * * *

UNITED STATES PATENT AND TRADEMARK OFFICE
CERTIFICATE OF CORRECTION

PATENT NO. : 4,594,682

DATED : June 10, 1986

INVENTOR(S) : Edward G. Drimak

It is certified that error appears in the above—identified patent and that said Letters Patent is hereby corrected as shown below:

Col. 4, line 53, "associates" should be -associated-.

Col. 5, line 8, "vector, registers" should be -vector registers,-.

Col. 8, line 23, "Output" should be -output-.

Col. 9, line 43, "for register" should be -from registers-;

line 53, begin a new paragraph after "56";

line 60, delete "5".

Col. 12, line 37, "vactor" should be -vector-;

line 55, insert -a- before "main".

Signed and Sealed this

Twenty-sixth Day of August 1986

[SEAL]

Attest:

DONALD J. QUIGG

Attesting Officer

Commissioner of Patents and Trademarks